Inventor.
Harry E. Kennedy.
By
Dewey, Strong, Townsend & Loftus
Attorneys.

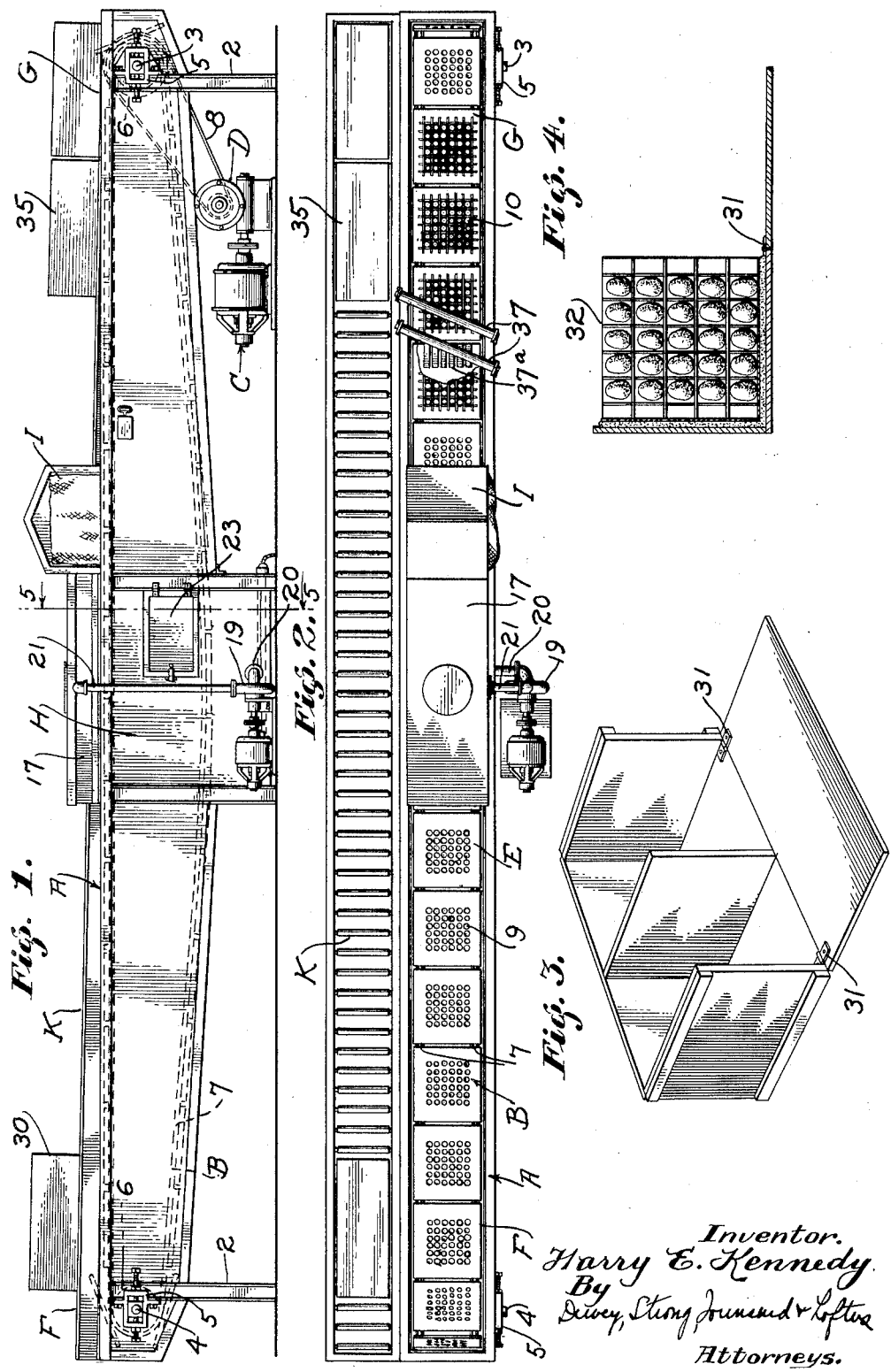

Patented Apr. 5, 1932

1,852,309

UNITED STATES PATENT OFFICE

HARRY E. KENNEDY, OF BERKELEY, CALIFORNIA

EGG PROCESSING AND CANDLING MACHINE

Application filed October 20, 1924. Serial No. 744,536.

This invention relates to an egg processing and candling machine.

Storage eggs are being used in great quantities, particularly by restaurants and bakeries, and in fact are also becoming more or less popular with the average housewife, for cooking and baking purposes, as storage eggs have improved considerably in quality during later years, this being largely due to the improved methods of processing and storing the eggs.

The method of processing and storing eggs which is most commonly used today is perhaps that in which the eggs are first coated with a mineral oil and then placed in cold storage. This method is very efficient, but is fairly costly due to the fact that the eggs must be re-handled a considerable number of times; that is, the eggs must be carefully candled to be sure that all cracked, blood-spotted or rotten eggs are removed. The eggs must be oil coated. The eggs must be graded, as to color and size, and the eggs must be packed and graded before placing in cold storage. The different operations or steps required increase breakage and require time and labor, with consequent increase in expense and final cost.

The object of the present invention is to provide a machine whereby eggs to be stored may be both processed and candled in one operation; a machine which is capable of handling eggs in great quantities and which will reduce breakage losses to a minimum, and further, a machine which permits ready transfer of the eggs directly from the packing cases or crates to the machine, and which similarly permits quick and ready return of the eggs to the cases after they have been processed and candled.

One form which my invention may assume is exemplified in the following description and illustrated in the accompanying drawings, in which—

Fig. 1 is a side elevation of the egg processing and candling machine.

Fig. 2 is a plan view of the machine.

Fig. 3 is a perspective view of an ordinary form of egg crate.

Fig. 4 is a cross-section of an egg crate showing the eggs in position when packed therein.

Figure 5:
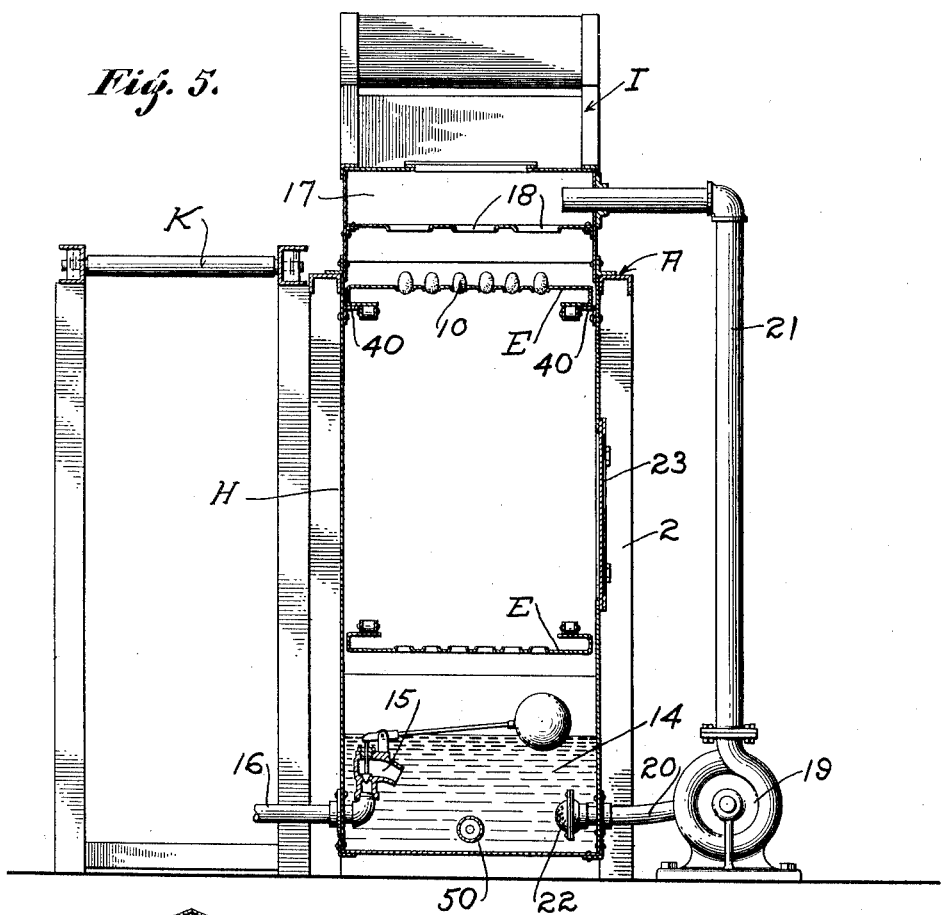
Fig. 5 is an enlarged cross-section of the machine, taken on line 5—5 of Fig. 1.

Referring to the drawings in detail, and particularly to Figs. 1 and 2, A indicates an elongated frame constructed of channel iron or any other suitable material, the frame being supported by vertically disposed legs 2 or the like.

Disposed at each end of the machine is a pair of cross-shafts 3 and 4; these shafts being journalled in adjustable bearing members 5. Each shaft is provided with a pair of interspaced sprocket gears, indicated in dotted lines at 6, and these gears carry and support a pair of interspaced endless sprocket chains 7. These chains form a continuous belt, generally indicated at B, and this belt is continuously driven from an electric motor C through a reduction drive D and a belt or chain, as indicated at 8, said belt or chain driving the shaft 3. Any suitable form of drive may be employed, however, and any particular detail description thereof is thought unnecessary.

Figure 6:
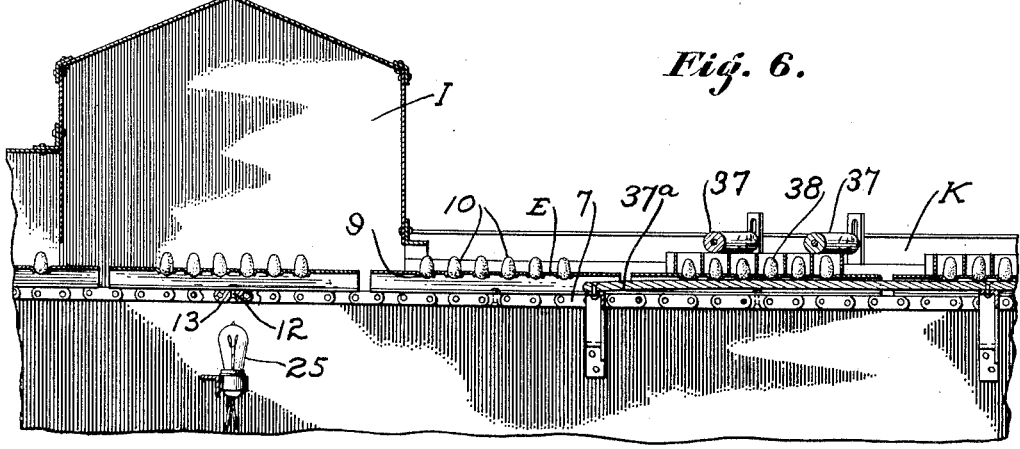
Fig. 6 is an enlarged partial longitudinal section showing the candling portion of the machine.
Figure 7:
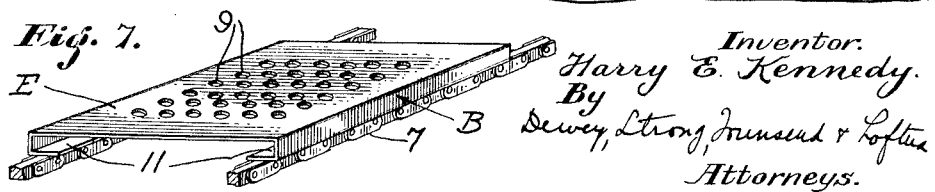
Fig. 7 is a perspective view of one of the egg supporting plates.

The endless belt B consists of the interspaced chain 7 and a plurality of plates which are carried thereby; these plates being generally indicated at E. Each plate is constructed of sheet iron or a similar material and they are substantially square in shape. The upper surface is perforated, as at 9, to receive and support a layer of eggs, such as indicated at 10, (see Figs. 5 and 6) and the side edges of each plate are bent to form channels extending from end to end, as shown at 11. (See Fig. 7). A bolt 12 passes through the center portion of each channel member 11 and is secured to a lug or similar device 13 carried by each chain. (See Fig. 6.) Each egg supporting plate is thus centrally supported with relation to the sprocket chain 7 and they are for this reason free to turn about the sprocket gears 6.

The eggs are placed on the plates, or that end of the machine which is generally indicated at F, and they are discharged from the machine at the opposite end, or that indicated at G. The eggs in travelling from the receiving end to the discharge end first pass through a housing generally indicated at H, where a coating of oil is applied, and they then pass through a housing I, where they are candled, and they are finally removed from the machine at the discharge end G, as will hereinafter be described.

The oil is applied to the eggs by a spray or shower action and this is accomplished as follows: The housing H, which is perhaps best illustrated in Fig. 5, is nothing more or less than a tank in which oil is maintained at a constant level, such as indicated at 14, by means of a float-actuated valve 15, the oil being delivered to the valve 15 from a suitable source of supply through a pipe 16. Formed in the upper portion of the tank or housing is a chamber 17. The bottom portion of this chamber is longitudinally slotted, as at 18, and these slots form a series of discharge or nozzle openings through which the oil is sprayed downwardly on the eggs as they pass through the housing. The housing is open at each end to permit the belt to pass therethrough and as the eggs pass under the spray, the oil is applied, the surplus oil draining through the plates and back into the tank. The oil is circulated by means of a pump 19, which is continuously driven, the oil entering the suction side of the pump through a pipe 20 and being delivered to the spray tank or chamber 17 by means of a pipe 21. The oil is thus constantly circulated and maintained under sufficient pressure to cause a spray action. The quantity of oil which is applied to the eggs will, of course, constantly decrease the level in the bottom of the tank, but such decrease is automatically taken care of by the float actuated valve 15, and a constant level is therefore maintained.

The suction side of the pump is provided with a strainer 22 and broken eggs or other impurities are thus kept out of the spray chamber 17. The side of the tank is provided with a door 23, which may be opened from time to time if it is desired to clean the bottom of the tank.

The shell of an egg is usually fairly porous and semi-transparent and this transparency is materially increased when the oil is applied. The action of the oil is more or less analogous to that of smearing a little oil on a piece of paper. Applicant knows that practically any white paper becomes fairly translucent when oiled, and the same thing happens to the shell of an egg. It is thus a very simple matter to candle the eggs and this is accomplished by passing the eggs through the housing I, after the oil has been applied. An operator sits within the housing, which is completely enclosed and dark. One or more electric lamps 25 are placed below the belt (see Fig. 6) and the light will therefore shine upwardly through the eggs. The operator will at a glance detect rotten, blood-spotted or cracked eggs and can therefore readily remove them. A layer of eggs usually consists of thirty eggs. The candler therefore looks at thirty eggs at one time as they pass beneath him and he can for this reason candle an enormous number of eggs during a day's run; that is, the old method of candling eggs is that of picking up the eggs one by one and placing them before a light to inspect them. This method requires the operator to pick up thirty eggs and handle and inspect each one individually; while in this instance the operator does not handle any eggs except those which are removed because they are cracked, blood-spotted, rotten or otherwise defective. The eggs after passing by the candler are again returned to the crates and are there repacked, when the eggs are ready to be placed in cold storage.

The method of placing the eggs on the belt and of removing them is also an important feature of the present invention. One or more operators are placed at each end of the machine. An endless, slightly inclined roller conveyor, runs parallel with the machine, as indicated at K. The crates full of eggs are placed at the receiving end of the conveyor at the point indicated at 30 (see Fig. 1). One side of the crate which is hingedly secured, as indicated at 31 (see Fig. 3) is opened and each layer of eggs is thus exposed and can be readily removed.

Removal is accomplished as follows: Each operator has a shovel-like implement which he forces in under the top layer of eggs. He at the same time forces the shovel under the spacer or filler shown at 32 (see Fig. 4) and is thus able to remove a complete layer of eggs, together with the spacer or filler surrounding the same. The eggs thus removed are placed on one of the egg receiving plates F in a position where the eggs will fall into the holes in the plate, and he then merely removes the filler and throws it back into the crate. Each layer of eggs is thus rapidly removed and when the crate is empty, the operator merely gives it a slight shove, thus permitting it to travel by gravity over the rollers K to the opposite end of the machine.

The eggs delivered to the plates first pass under the spraying device, and then through the candling house, and they are then ready for return to the same egg crate or case. This empty case has by this time reached the discharge end of the machine and assumes the position indicated at 35 (see Figs. 1 and 2). The operator stationed at this end of the machine first removes the egg fillers or spacers and places them over the eggs at the point indicated at 35, and at the same time replaces such eggs as may have been removed by the candler. The fillers are shoved down over the eggs by means of a pair of angularly disposed rollers 37 and the eggs are at the same time raised up into the fillers by means of a series of cam bars 37a over which each plate passes; that is, the holes in the plates are in line formation and there is cam bar 37a positioned directly under each line formation of holes. The cam bars gradually lift the eggs out of the perforated plates up into the filler, as shown at 38, (see Fig. 6) and a shovel is again passed under the eggs and filler after they have passed under the rollers 37. The eggs are then transferred from the shovel directly to the empty case and the egg case or crate is thus rapidly refilled.

The belt formed by the interspaced sprocket gears and the plates carried thereby is of considerable length and it is for this reason necessary to support the upper run of the belt throughout its length to maintain it in a horizontal position. This is accomplished by placing a pair of angle iron supporting flanges 40 below the upper run of the belt.

From the foregoing it can be seen that the necessity of removing the eggs one by one from the crates is eliminated as they are removed a layer at a time, and as they are moved a layer at a time, it is a simple matter to center and position them with relation to the perforations or holes in the plates. This eliminates unnecessary handling of each individual egg. The oil is readily applied to all the eggs by means of the spray through which they are passed. The eggs are readily candled and are not handled by the candler; that is, the candler does not handle any eggs except those which are removed due to some defect or another. When the eggs reach the discharge end of the machine, the operators merely replace the fillers. The eggs are automatically pushed upwardly into the fillers and out of the perforated plates, and they are then transferred from the plates by means of shovels back to the crates, thus eliminating individual handling of each egg at this point. A material labor saving is obtained, and the time required to handle the eggs is similarly reduced, and breakage is also reduced to a minimum.

It might also be stated that it has heretofore been more or less common practice to dip the eggs in a bath of hot oil and as this oil was maintained at a temperature of approximately 256° F., it can readily be seen that a great number of eggs were cracked. In the present instance, the same temperature may be employed if desired, but danger of cracking the eggs is avoided as the oil applied in the form of a spray gradually heats the egg and thus prevents cracking. It might also be stated that applicant has found that the temperature of 190° F. is sufficient for the purpose of coating the eggs and breakage, due to rapid temperature change, is thus further reduced. Any suitable means may be employed for the purpose of maintaining oil at this temperature. For instance, an electric resistance heating element may be placed in the oil reservoir, as indicated at 50, and this may in turn be connected with a thermostat (not here shown), so that any desired temperature may be automatically maintained.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dictate or various uses may demand.

Having thus described my invention, what I claim and desire to secure by Letters Patent is—

1. A machine for applying a coat of oil to eggs, comprising an endless movable belt adapted to receive and support a plurality of eggs, and an oil-precipitating apparatus under which the belt supporting the eggs passes, to apply the coat of oil to the eggs, means for maintaining the oil at a predetermined temperature, and means for aerating and maintaining the oil in continuous circulation.

2. A machine of the character described comprising an endless belt, a plurality of perforated plates secured to the belt, the perforations in said plates being provided for the reception of eggs placed on end, means for transmitting movement to the belt, means for spraying oil on the eggs while supported by the plates, and means for raising the eggs upwardly away from the plates.

3. A machine of the character described comprising an endless belt, a plurality of perforated plates secured to the belt, the perforations in said plates being provided for the reception of eggs placed on end, means for transmitting movement to the belt, means for spraying oil on the eggs while supported by the plates, and means for automatically raising the eggs upwardly away from the perforated plates.

4. A machine of the character described comprising an endless belt, a plurality of perforated plates secured to the belt, the perforations in said plates being provided for the reception of eggs placed on end, means for transmitting movement to the belt, means for spraying oil on the eggs while supported by the plates, an enclosed darkened housing through which the belt is adapted to move, and means for illuminating the underside of the belt and the perforated plates when passing through the housing to permit candling of the eggs.

5. A machine of the character described comprising an elongated frame, an endless belt mounted in the frame, means for transmitting a continuous movement to said belt, a plurality of perforated plates carried by the belt, the perforations in said plates being provided for the reception of eggs placed on end, a housing within the frame through which the endless belt travels, a plurality of spray nozzles disposed in the housing above the belt, and means for delivering oil thereto to spray the eggs with oil as they pass through the housing.

6. A machine of the character described comprising an elongated frame, an endless belt mounted in the frame, means for transmitting a continuous movement to said belt, a plurality of perforated plates carried by the belt, the perforations in said plates being provided for the reception of eggs placed on end, a housing within the frame through which the endless belt travels, a plurality of spray nozzles disposed in the housing above the belt, means for delivering oil thereto to spray the eggs with oil as they pass through the housing, and a plurality of inclined rods secured below the belt, said rods adapted to engage the eggs and raise them vertically with relation to the perforated plates.

7. A machine of the character described comprising an elongated frame, an endless belt supported on the frame, a plurality of perforated plates carried by the belt, the perforations in said plates being provided for the reception of eggs placed on end, means for transmitting a continuous movement to the belt, a housing in the frame through which the belt travels, a tank in the bottom of said housing, means for maintaining a predetermined level of oil therein, a tank disposed above the belt and in said housing, said last-named tank having a plurality of spray nozzles formed in the bottom portion thereof, means for delivering oil from the lower tank to the upper tank so that the oil may discharge in the form of a spray upon the eggs carried by the plates, a darkened enclosed housing through which the belt passes, electric lights disposed below the belt and the housing to permit candling of the eggs, and means for automatically raising the eggs with relation to the plates to permit removal thereof after the eggs have been subjected to an oil spray action and to candling.

8. A machine of the character described, comprising an endless belt, a plurality of perforated plates secured to the belt, the perforations in said plates being provided for the reception of eggs placed on end, means for transmitting movement to the belt, and means for automatically raising the eggs upwardly, in the perforations and for sustaining the eggs in a raised position to facilitate removal thereof from the perforated plates.

9. A machine of the character described, comprising an endless belt, a plurality of perforated plates secured to the belt, the perforations in said plates being provided for the reception of eggs placed on end, means for transmitting movement to the belt, and a plurality of inclined rods below the belt, said rods adapted to engage the eggs and raise them vertically with relation to the perforated plates, and other means maintaining the eggs in their raised position to facilitate removal thereof from the perforated plates.

10. Apparatus of the character described comprising a conveyor, a plurality of egg supporting trays carried by the conveyor and having a plurality of openings therein adapted to contain eggs with the lower ends of the eggs projecting below the trays and means engaging the eggs during movement of the conveyor and pushing said eggs upwardly through said openings preliminary to removal of the eggs from the trays.

11. An apparatus of the character described comprising a conveyor, a tray fixed to and carried by the conveyor and having a plurality of openings formed therein adapted to contain eggs, a removable filler superimposed upon the tray, and means operative during movement of the conveyor to transfer the eggs from the tray into the filler disposed above the tray.

12. An apparatus of the character described comprising a conveyor, a tray fixed to and carried by the conveyor and having a plurality of openings formed therein adapted to contain eggs, a removable filler superimposed upon the tray, roller means adapted to engage the top of the filler, and means operative during movement of the filler beneath the rollers to cause the eggs to be transferred from the tray into the filler disposed above the tray.

13. An egg handling machine comprising an endless conveyor, a tray secured to and carried by the conveyor, said tray having a plurality of openings therein adapted to contain eggs in a general upright position, the eggs as carried by the tray being so arranged as to be alineable with the cells of an egg carton filler placed upon the tray, and means operative during a portion of the travel of the tray for causing relative movement between the eggs and the filler placed upon the tray to effect positioning and retention of the eggs within the cells of the filler while the filler travels with and above the tray.

14. An egg handling machine comprising an endless conveyor, a tray secured to and carried by the conveyor, said tray having a plurality of openings therein adapted to contain eggs, the eggs as carried by the tray being so arranged as to be alineable with the cells of an egg carton filler placed upon the tray, and a roller arranged to engage and press down upon the filler during a portion of the travel of the tray.

15. An egg handling machine comprising an endless conveyor, a tray secured to and carried by the conveyor, said tray having a plurality of openings therein adapted to contain eggs, the eggs as carried by the tray being so arranged as to be alineable with the cells of an egg carton filler placed upon the tray, a roller arranged to engage and press down upon the filler during a portion of the travel of the tray, and means for effecting a relative transposition of the eggs into the cells of the filler while the filler is engaged by said roller.

HARRY E. KENNEDY.